United States Patent [19]

Lind et al.

[11] 4,445,951
[45] May 1, 1984

[54] METHOD OF MANUFACTURING COMPOSITE MATERIALS

[75] Inventors: David J. Lind, Breadsall; Joyce Richards, Belper, both of England

[73] Assignee: Rolls-Royce Limited, London, England

[21] Appl. No.: 383,619

[22] Filed: Jun. 1, 1982

[30] Foreign Application Priority Data

Jul. 1, 1981 [GB] United Kingdom ................. 8120321

[51] Int. Cl.³ .............................................. B32B 7/08
[52] U.S. Cl. ..................................... 156/93; 112/401; 112/412; 112/415; 156/309.6; 428/102; 428/104; 428/367; 428/375; 428/396; 428/902
[58] Field of Search ............... 156/93, 309.6; 428/102, 428/103, 104, 902, 367, 375, 396; 112/401, 412, 112/415

[56] References Cited

U.S. PATENT DOCUMENTS 3,841,954 10/1974 Lawler .................................. 428/102
4,320,160 3/1982 Nishimura et al. ............. 428/902 X
4,407,876 10/1983 Otty ...................................... 428/102

FOREIGN PATENT DOCUMENTS 1485585 9/1977 United Kingdom .
1570000 6/1980 United Kingdom .

Primary Examiner—Robert A. Dawson
Attorney, Agent or Firm—Cushman, Darby & Cushman

[57] ABSTRACT

A method of manufacturing a composite material in which layers of reinforcing filaments are stitched across with filaments of a thermoplastic polymer and then interposed between sheets of the same thermoplastic polymer as that used to stitch across the reinforcing filaments. The resultant stack is then heated under pressure for sufficient time for the thermoplastic polymer to impregnate the reinforcing filaments whereupon the thus formed composite is cooled under compression in order to avoid any distortion thereof.

7 Claims, 1 Drawing Figure

U.S. Patent      May 1, 1984      4,445,951
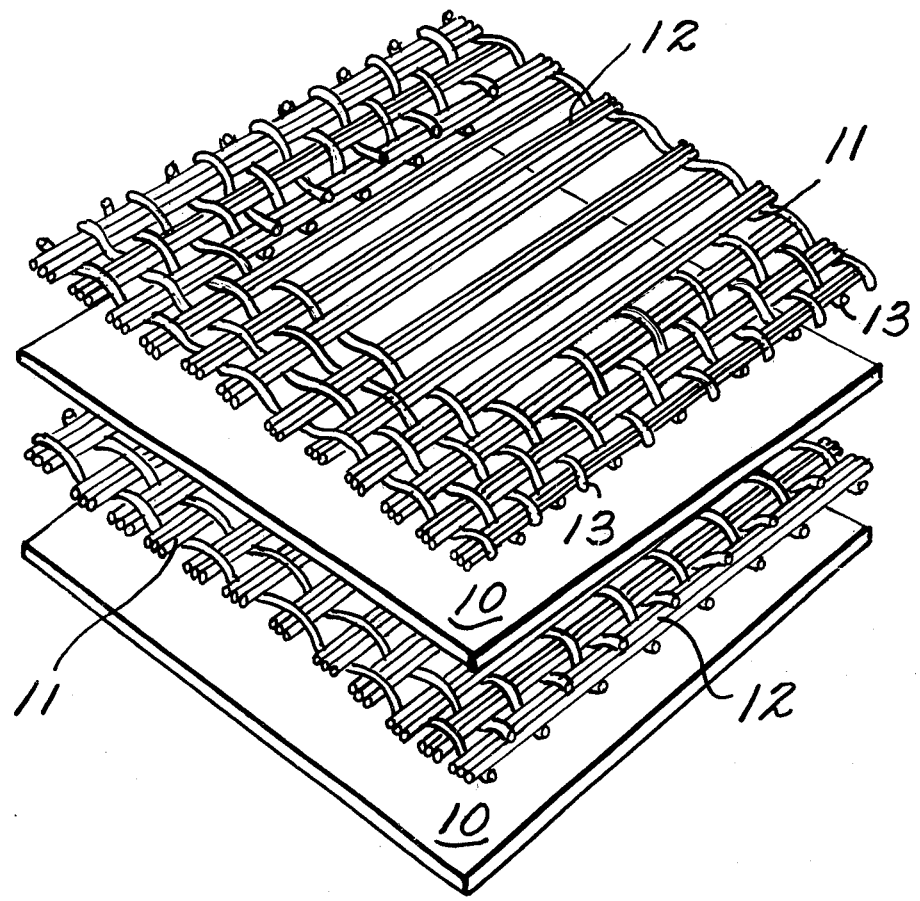

METHOD OF MANUFACTURING COMPOSITE MATERIALS

BACKGROUND OF THE INVENTION

This invention relates to a method of manufacturing composite materials and in particular to a method of manufacturing composite materials comprising reinforcing filaments enclosed in a matrix of a thermoplastic polymer.

It has long been common practice to manufacture composite materials which comprise reinforcing filaments enclosed in a matrix of a thermosetting polymer. Thus one particularly useful composite material comprises reinforcing filaments of carbon enclosed in a matrix of an epoxy resin. Whilst such composite materials have been extremely useful in replacing certain metals as constructional materials in the engineering industry, they do nevertheless suffer from certain disadvantages which makes their manufacture troublesome. For instance there are storage problems associated with thermosetting polymers prior to their incorporation into a matrix since they tend to have finite shelf lives and sometimes require to be stored in a refrigerated environment. Additionally, after a thermosetting polymer has been heated to an appropriate temperature, it hardens permanently, thereby effectively precluding its further shaping by deformation.

Thermoplastic polymers do not have storage problems since they have high molecular weights and are additionally thermoformable so that they can be reworked many times after their initial moulding at temperature. Thus thermoplastic polymers have certain attractions as a replacement for thermosetting polymers as a matrix material in filament reinforced composite materials. However, there are difficulties in producing a composite material which comprises reinforcing filaments enclosed in a matrix of a thermoplastic polymer. One route for the manufacture of such composite materials entails impregnating the reinforcing filaments with a solution of the thermoplastic polymer in a suitable solvent. The solvent is then evaporated off and moulding carried out to provide the resultant composite material. Composite materials manufactured by such a method suffer from several disadvantages. For instance, it is very difficult to completely evaporate off the polymer solvent. Some trapping of the solvent may occur with the result that the composite material is to a certain extent, porous. This reduces its strength and sometimes leads to the accelerated thermal degradation of the polymer if the composite material is subjected in use to elevated temperatures. Another disadvantage is that it is not usually possible to accurately monitor the actual amount of polymer which is impregnated into the filaments. Some resin usually runs off the filaments with the result that the final polymer content of the composite material is lower than anticipated.

In U.K. Pat. No. 1,485,586 there is described a method of manufacturing a composite material in which filaments are interleaved between films of a thermoplastic polymer and the resultant sandwich structure subjected to heat and pressure so that the polymer flows and impregnates the filaments. This method has the advantage of not requiring the use of a solvent and consequently avoids the pitfalls associated with solvent use. However, if the polymer is of high viscosity at the temperatures usually employed in this type of method, then difficulty is encountered in achieving a satisfactory level of impregnation of the filaments by the polymer. Some separation of the fibres tends to occur so that the resultant composite material has a low filament level per unit volume of composite material, thereby adversely affecting its mechanical properties.

U.K. Pat. No. 1,570,000 describes a somewhat similar method of manufacturing a composite material, differing in that the filaments are impregnated with a solution of a thermoplastic polymer in a suitable solvent and the solvent evaporated off prior to the impregnated filaments being interleaved between films of a second thermoplastic polymer. Then, as in the previous method the resultant sandwich structure is subjected to heat and pressure to cause the thermoplastic polymer films to flow after which the assembly is cooled under pressure to avoid distortion of the resultant composite material. Thus the first thermoplastic polymer serves to bind the filaments together, thereby reducing the tendency for the filaments to separate during heating under compression. Thus there is less likelihood of the resultant composite material having a lower than expected filament level per unit volume of composite material. The teachings of U.K. Pat. No. 1,570,000 are directed to the impregnation of the filaments with a thermoplastic polymer so that there is a polymer pick-up by the filaments which, after solvent evaporation, amounts to 16 to 40% by weight. Unfortunately this means that whilst the method permits the use of films of high viscosity thermoplastic polymers, the resultant composite material is prone to solvent attack, even if the thermoplastic polymer of the film is of low solvent solubility. Thus the thermoplastic polymer originally applied in solvent solution is prone to solvent attack, thereby leading to increased likelihood of stress-cracking occurring in the resultant composite material. A further disadvantage of this method is that whilst the thermoplastic polymer used for the films may have desirable properties as a matrix material, the incorporation of a relatively large amount of a different thermoplastic polymer in the matrix may have a deleterious effect upon the properties of the resultant composite material.

It is an object of the present invention to provide a method of manufacturing a composite material wherein the aforementioned difficulties in manufacturing filament reinforced, thermoplastic polymer matrix composite materials are substantially avoided.

BRIEF DESCRIPTION OF THE DRAWING

The FIGURE of the drawing is an elevated perspective view of a piece of material according to the present invention prior to final assembly and compression into a composite.

DETAILED DESCRIPTION OF THE INVENTION

According to the present invention, a method of manufacturing a composite material comprises the steps of cross-stitching a layer or layers of reinforcing filaments with filaments of a thermoplastic polymer so that said thermoplastic polymer filaments maintain said reinforcing filaments in a given configuration, forming a structure of the or each layers of the thus cross-stitched reinforcing filaments and sheets of the same thermoplastic polymer as that used in filament form to cross-stitch said reinforcing filaments so that the or each layer of cross-stitched filaments is interposed between said sheets of said thermoplastic polymer, compressing said structure at a temperature at which said thermoplastic polymer is mobile, maintaining said compression for sufficient time for said thermoplastic polymer to impregnate said layer or layers of cross-stitched filaments, cooling the thus formed composite material under compression in order to avoid any distortion thereof and subsequently discontinuing said compression.

DETAILED DESCRIPTION OF THE DRAWINGS

The attached FIGURE shows a partially expanded elevated perspective view of a structure of the invention prior to lamination and compression. Two sheets of thermoplastic polymer 10 are separated by unidirectional filaments of the reinforcing fiber 11 (shown as tows 12 in this illustration). The unidirectional filaments are cross-stitched together with thermoplastic polymer filaments 13 of the same polymer as sheets 10. The structure is assembled with alternating layers of thermoplastic sheet 10 and fibers 11, 12 and 13, and compressed.

As used herein the expression "cross-stitching" means to stitch across, such as by inserting a thermoplastic polymer filament 13 above and below adjacent groups of reinforcing fiber tows 12 as depicted in the FIGURE.

Thus the thermoplastic polymer filaments used to cross-stitch the reinforcing filaments serve to maintain the reinforcing filaments in the desired configuration during the compression step. Consequently there is less tendency for reinforcing filament separation to occur with the result that the reinforcing filament level per unit volume of composite material is at its predicted value. Moreover since the reinforcing filaments are maintained in the desired configuration by filaments of the same thermoplastic polymer as that of the sheets, there is only one thermoplastic polymer in the matrix of the resultant composite material. This means therefore that the method of the present invention may be carried out using thermoplastic polymers which have low solvent solubility or which are insoluble in the common solvents. The method of the present invention therefore provides retention of the reinforcing filament in the desired configuration without having to resort to the use of highly soluble thermoplastic polymers which could have a deleterious effect upon the properties of the resultant composite material.

The thermoplastic polymer used for the sheets and cross-stitching of the reinforcing filament may be an aromatic polyether polymer. The preferred aromatic polyether polymer is an aromatic polyetheretherketone which is marketed by ICI Limited under the name "PEEK". This aromatic polyetheretherketone differs from a large number of other thermoplastic polymers in that it is capable of a high degree of crystallisation. Thus a figure of 48% crystallinity has been reported. This degree of crystallinity imparts enhanced mechanical properties to the polymer as well as a high degree of resistance to the common solvents. Moreover it has a melting point of 334° which makes it suitable for high temperature applications.

The structure of cross-stitched reinforcing filament and sheets of the thermoplastic polymer is compressed at a pressure for instance 14 MN/m$^2$, which is sufficient to result in the impregnation of the bond filaments by the sheets of thermoplastic polymer. If the thermoplastic polymer is "PEEK" then this compression may be carried out at a temperature of approximately 400° C.

The reinforcing filaments may be of any of the types which are commonly used for reinforcement in composite materials. Thus mention may be made of filaments of glass, graphite, steel, silicon carbide, alumina, boron, boron nitride etc. However, we prefer to utilise filaments of carbon.

Whilst the method of the present invention may be used in the manufacture of finished articles, it may also be used in the manufacture of prepregs. Thus prepregs comprise composite material portions which may be subsequently grouped together and subjected to heat and pressure in order to fuse them together and forms them into a finished article.

The layer or layers of reinforcing filament which are cross-stitched by filaments of the thermoplastic polymer may be in the form of tows or alternatively may be in the form of woven cloths. In the latter case, the filaments of the thermoplastic polymer may constitute some or all of the weft filaments of the cloth.

We claim:

1. A method of manufacturing a composite material comprising the successive steps of:
   (1) stitching across at least one layer of reinforcing filaments with filaments of a thermoplastic polymer so that said thermoplastic polymer filaments maintain said reinforcing filaments in a given configuration,
   (2) forming a structure of said at least one layer of the thus cross-stitched reinforcing filaments and sheets of the same thermoplastic polymer as that used in filament form to cross-stitch said reinforcing filaments so that one layer of cross-stitched filaments is interposed between two sheet of said thermoplastic polymer,
   (3) compressing said structure at a temperature at which said thermoplastic polymer is mobile,
   (4) maintaining said compression for sufficient time and temperature for the thermoplastic polymer of the sheets and filaments to impregnate said at least one layer of reinforcing filaments,
   (5) cooling the thus formed composite material under compression in order to avoid any distortion thereof, and subsequently
   (6) discontinuing said compression.

2. A method of manufacturing a composite material as claimed in claim 1 wherein said at least one layer of reinforcing filaments is in the form of tows.

3. A method of manufacturing a composite material as claimed in claim 1 wherein said at least one layer of reinforcing filaments is in the form of a woven cloth.

4. A method of manufacturing a composite material as claimed in claim 3 wherein at least some of the weft filaments of the cloth are constituted by the filaments of said thermoplastic polymer.

5. A method of manufacturing a composite material as claimed in claim 1 wherein said thermoplastic polymer is an aromatic polyether.

6. A method of manufacturing a composite material as claimed in claim 5 wherein said aromatic polyether is an aromatic polyetheretherketone.

7. A method of manufacturing a composite material as claimed in claim 1 wherein said reinforcing filaments are of carbon.

* * * * *